United States Patent [19]

Brown

[11] 4,206,559

[45] * Jun. 10, 1980

[54] SUPPORTING LEG ASSEMBLY FOR AN ILLUMINATED TRANSPARENCY VIEWER

[75] Inventor: Donald J. Brown, Naperville, Ill.

[73] Assignee: Knox Manufacturing Co., Wood Dale, Ill.

[*] Notice: The portion of the term of this patent subsequent to May 8, 1996, has been disclaimed.

[21] Appl. No.: 868,983

[22] Filed: Jan. 12, 1978

[51] Int. Cl.² ............................................. G02B 27/02
[52] U.S. Cl. .................................... 40/361; 40/606; 248/166; 248/188.6; 248/455; 248/461
[58] Field of Search .................. 40/361, 362, 366, 367, 40/152.1, 606, 610; 248/165, 166, 173, 188.6, 432, 434, 447, 455, 456, 457, 461

[56] References Cited

U.S. PATENT DOCUMENTS

| | | | |
|---|---|---|---|
| 1,466,038 | 8/1923 | Brubaker | 40/367 X |
| 2,461,440 | 2/1949 | Petty | 248/455 |
| 2,691,238 | 10/1954 | Svatos | 248/456 |
| 3,155,364 | 11/1964 | Berg | 248/439 |
| 3,773,154 | 11/1973 | Mitchell | 248/455 X |
| 3,920,213 | 11/1975 | Hanson, Jr. | 248/455 X |
| 4,152,852 | 5/1979 | Brown | 40/361 |

Primary Examiner—John F. Pitrelli
Assistant Examiner—G. Lee Skillington
Attorney, Agent, or Firm—Wegner, Stellman, McCord, Wiles & Wood

[57] ABSTRACT

An illuminated transparency viewing device is supported by a leg construction which may be adjusted to orient the viewer at different angles relative to a supporting surface. Two pairs of spaced apart legs are provided, each leg being pivotally mounted to the viewer housing for movement between retracted and extended positions so that either pair may be retracted or extended to tilt the viewer on edge. Each pair of legs may be of different length than that of the other pair. One leg of each pair is colinearly arranged with a corresponding leg of the other pair to define a pair of leg assemblies. Each leg assembly therefore has a pair of legs, each being mounted for pivotal movement between the side walls of a U-shaped bracket secured to the bottom of the viewer housing and may be extended from or retracted into the bracket.

15 Claims, 18 Drawing Figures

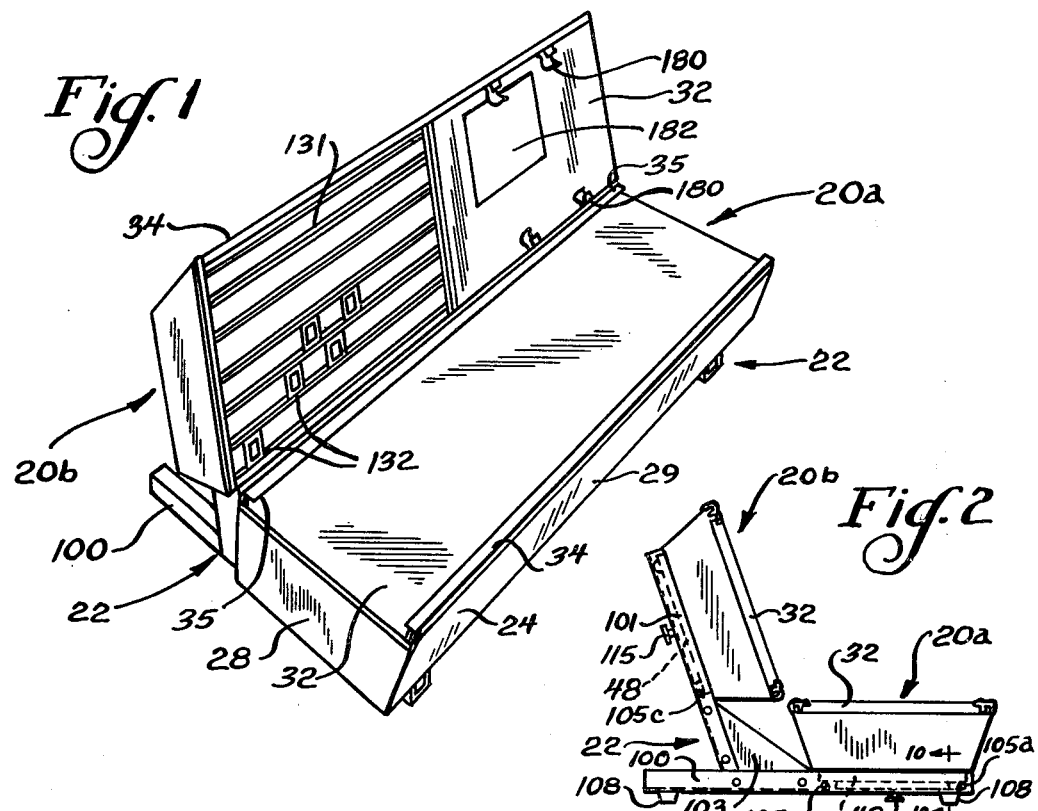
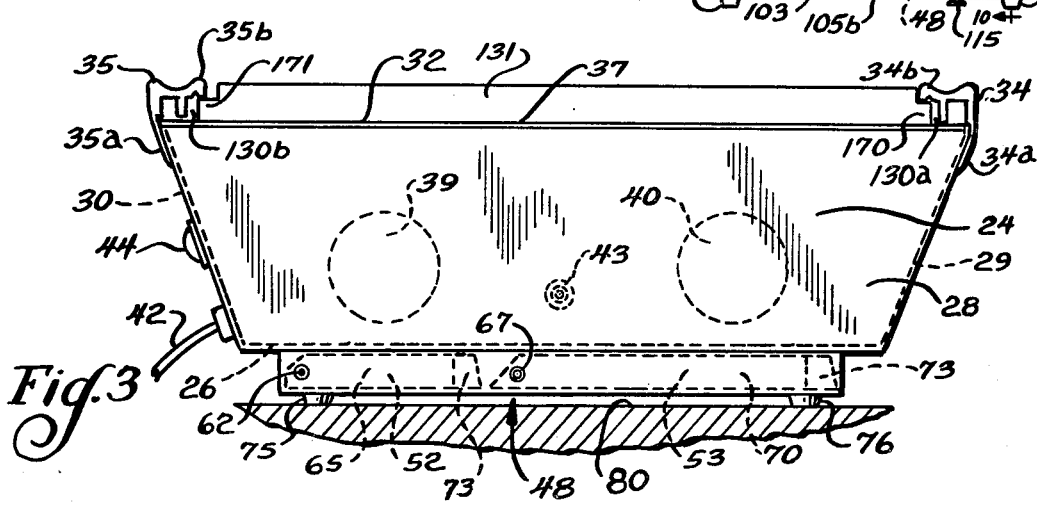
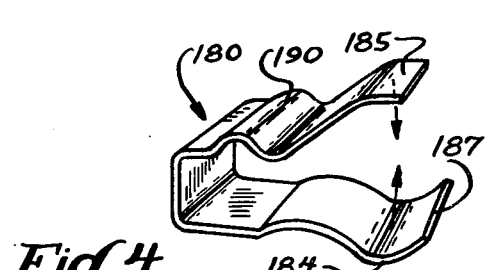
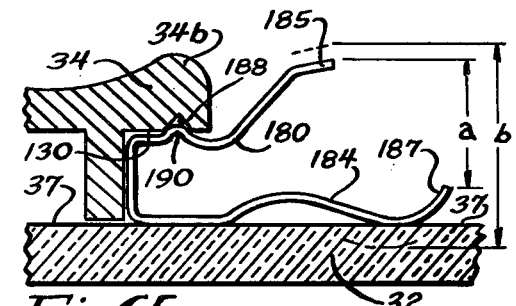

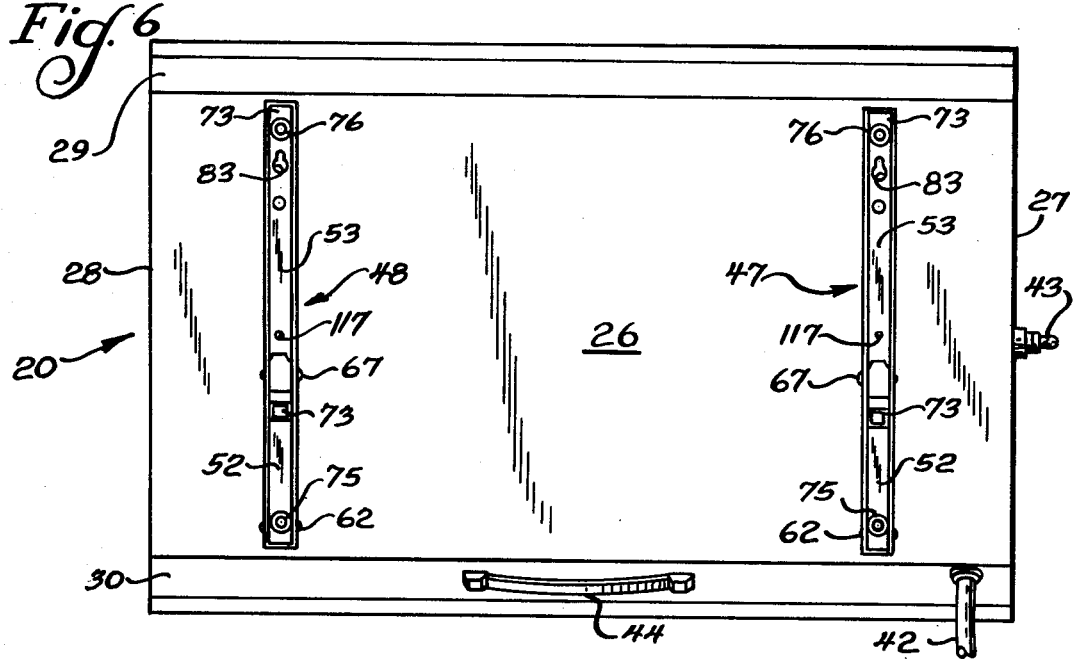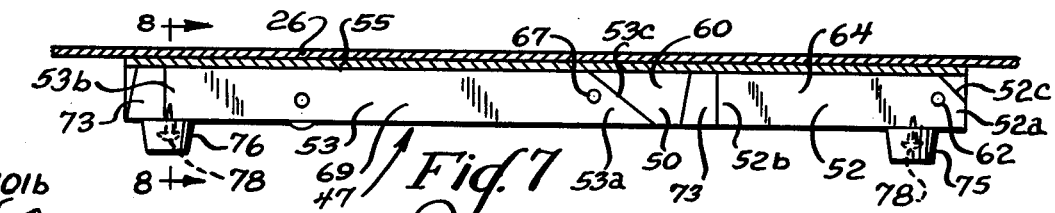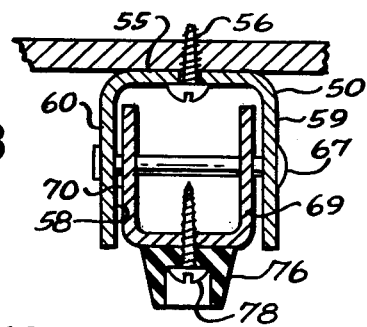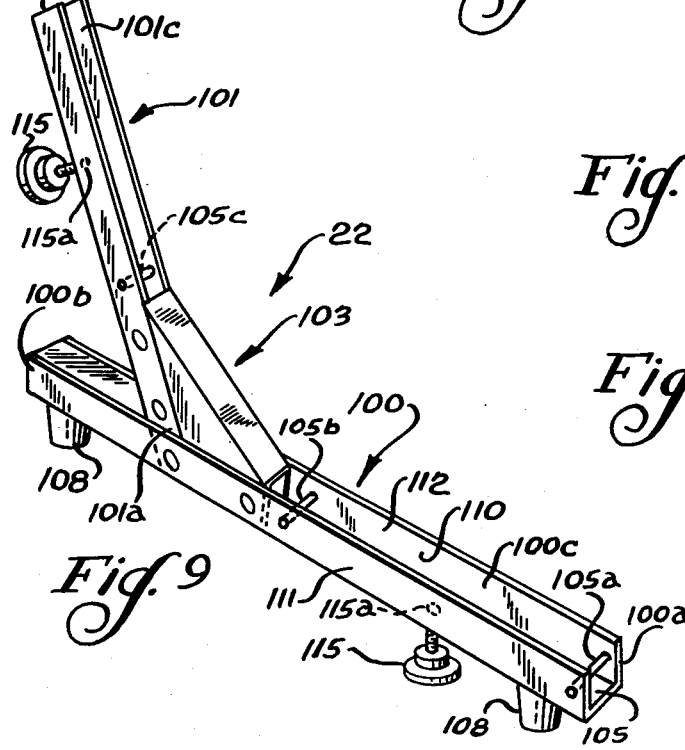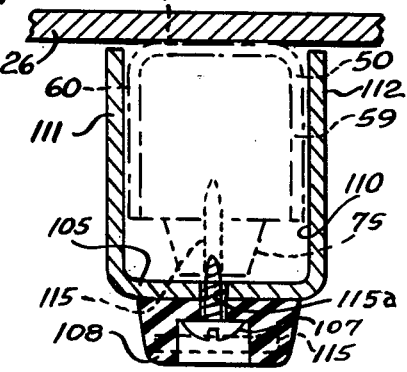

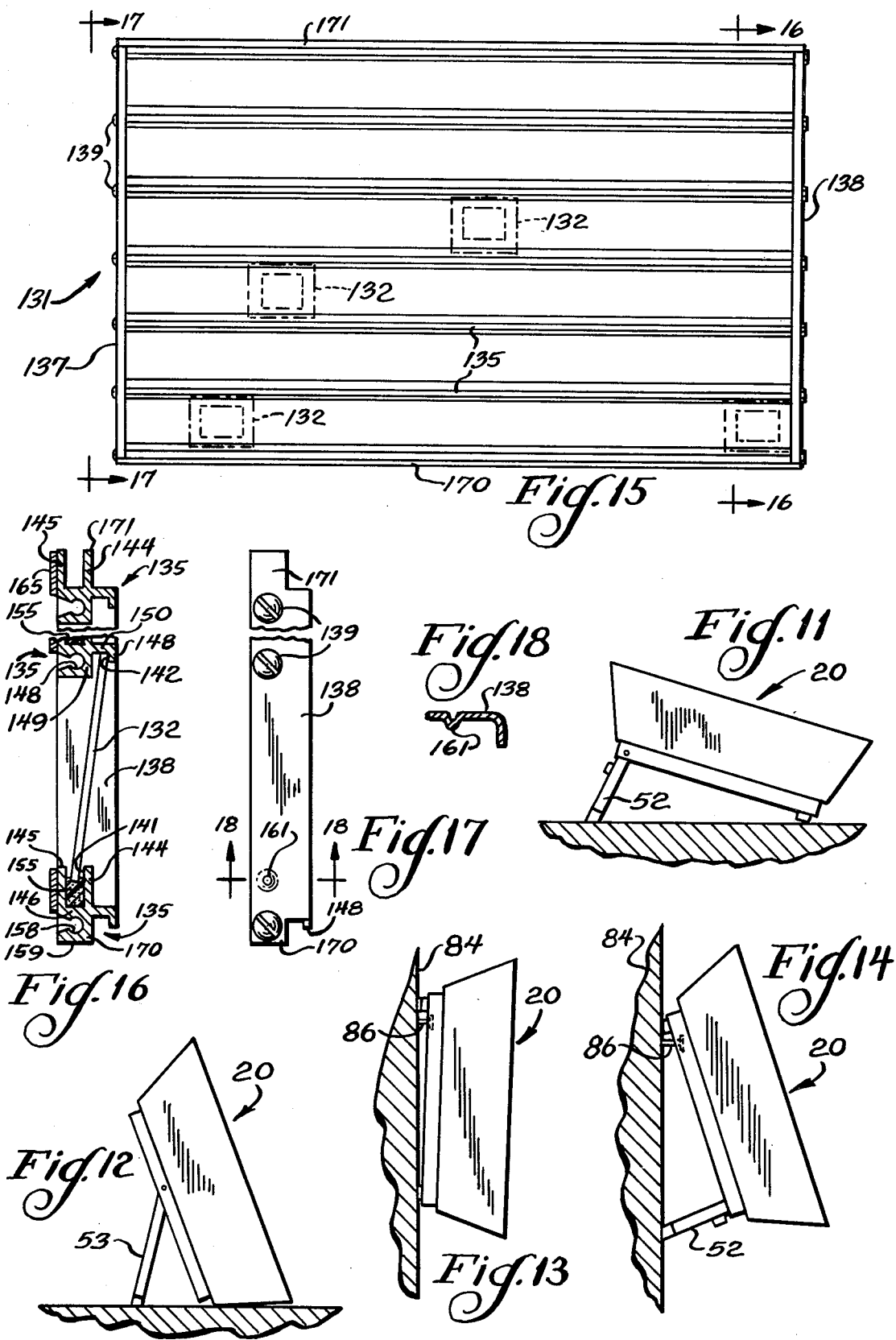

4,206,559

SUPPORTING LEG ASSEMBLY FOR AN ILLUMINATED TRANSPARENCY VIEWER

BACKGROUND OF THE INVENTION

This invention relates generally to a light box for viewing transparencies and the like and, more particularly, to a leg construction for supporting a transparency viewer on a supporting surface.

Illuminated transparency viewers, or light boxes, commonly have a light source for providing a strong uniform light on a translucent surface to enable negatives, transparencies, slides and the like to be conveniently examined. Typically, such viewers are employed for editing or sorting and sequencing of such transparencies and slides.

In the prior art, illuminated viewers of the general type illustrated herein have been mounted in specially constructed tables so that the translucent surface functions as the table top. Oftentimes, the viewer will be constructed so that it may be positioned flat on a table top with the translucent surface lying in a horizontal plane. The latter type of viewers may also be adapted to be mounted on a wall to provide a vertical viewing surface. Sometimes, the viewer housing is constructed so that the translucent surface is slanted relative to horizontal when the viewer is placed on a table top or other horizontal surface, the orientation of the translucent surface being determined by the configuration of the housing.

The above described viewers are not readily adapted to enable adjustment of the viewing angle of a light box in accordance with the desires of the user. Although viewers have been made available which have adjustable supports, they have not been entirely satisfactory in providing a high degree of adjustability. One such viewer employed a pair of similar triangular leg supports mounted on the bottom wall of the viewer housing which were pivotally connected along respective edges so that they could be turned 180° from each other to tilt the viewer 15° from horizontal. Angles greater than 15° were achievable with such supports, but resulted in an overly large support assembly.

SUMMARY OF THE INVENTION

It is the principal object of the present invention to provide a supporting leg assembly for a transparency viewer which is adjustable to orient the viewer in a variety of viewing positions on a table top or a wall. It is also an object of the invention to provide a leg assembly which is adapted to be connected to a supporting frame so that a pair of such viewers are supported in operative positions, one horizontally and one vertically.

In accordance with the invention, a leg construction for adjustably orienting an illuminated viewer on a supporting surface includes two pairs of legs, each leg being pivotally mounted to the viewer housing. Each leg is mounted to swing from a retracted position in close alignment with the bottom of the housing to an extended position outward from the bottom of the housing. The viewer may be positioned on the supporting surface with none of the legs extended, with one pair of legs extended, or with the other pair of legs extended so as to provide a variety of angles at which the viewer may be supported.

In an exemplary embodiment of the invention, each pair of legs has a leg mounted colinearly with a corresponding leg of the other pair, each colinear pair defining a separate leg assembly. Each leg assembly is mounted to the housing bottom by means of an inverted U-shaped bracket which has a pivot pin extending between the side walls thereof through each of its respective legs. Each leg may thus pivot about the pivot pin so that it may be extended from the channel defined by the bracket or retracted into the channel.

In a preferred embodiment of the invention, the legs of one pair are shorter than the legs of the other pair. Further, the shorter legs are pivotally mounted at the rear of the mounting bracket, while the longer legs are pivotally mounted near the center of the mounting bracket to maximize the difference in positions. When the short legs are extended to lift the rear edge of the viewer, the viewer is tilted at about a 15° angle. When the long legs are extended, the viewer is tilted at about a 70° angle.

BRIEF DESCRIPTION OF THE DRAWINGS

FIG. 1 is a perspective view of two transparency viewers mounted on a frame to provide horizontal and vertical viewing potential;

FIG. 2 is a side elevational view of the two transparency viewers and the frame shown in FIG. 1;

FIG. 3 is a side elevational view of a single transparency viewer positioned on a horizontal surface;

FIG. 4 is an enlarged perspective view of a clip which may be used in connection with the transparency viewer to hold transparencies thereon;

FIG. 5 is an enlarged, fragmentary, cross-sectional view of the clip of FIG. 4 disposed in a groove defined between the viewer frame and the translucent sheet;

FIG. 6 is a bottom plan view of the transparency viewer of FIG. 3 showing the disposition of the leg assemblies;

FIG. 7 is a side elevational view of a leg assembly shown in FIG. 6 with certain side parts broken away to show the small and large pivoted legs in nested position;

FIG. 8 is an enlarged, cross-sectional view taken along line 8—8 of FIG. 7 showing one of the leg assemblies secured to the bottom of the transparency viewer;

FIG. 9 is a perspective view of one of the frame assemblies which supports the transparency viewers in FIG. 1;

FIG. 10 is an enlarged cross-sectional view of the frame assembly and leg assembly taken along line 10—10 of FIG. 2 showing the relationship thereof when engaged;

FIG. 11 is a schematic diagram showing the short legs extended to tilt the transparency viewer at a slight angle from horizontal;

FIG. 12 is a schematic diagram showing the long legs extended to tilt the transparency viewer at a greater angle than shown in FIG. 11;

FIG. 13 is a schematic diagram showing the transparency viewer mounted against a wall surface;

FIG. 14 is a schematic diagram showing the short legs extended to tilt the transparency viewer slightly away from the wall;

FIG. 15 is a front elevational view of the overlay shown with the transparency viewers in FIGS. 1 and 3;

FIG. 16 is an enlarged cross-sectional view of the overlay taken along line 16—16 of FIG. 15 showing the configuration of the overlay channel members and a slide held therebetween;

FIG. 17 is an enlarged side elevational view of the overlay of FIG. 15 taken along line 17—17; and FIG. 18 is an enlarged, cross-sectional view of the end piece secured at the opposite ends of the channel members taken along line 18—18 of FIG. 17.

DESCRIPTION OF THE PREFERRED EMBODIMENT

Referring to FIGS. 1-3, transparency viewers, designated 20, are illustrated in combination (FIGS. 1 and 2) and singly (FIG. 3). Although each transparency viewer is constructed similarly, for clarity herein, the horizontal viewer will be designated 20a and the rear, uprightly disposed viewer will be designated 20b. As will be described in more detail hereinafter, when the transparency viewers are used in combination, two frame assemblies, each generally designated 22, support one transparency viewer 20a in a horizontal position and a second transparency viewer 20b in an inclined upright position.

The transparency viewer 20 generally includes a metal housing 24 configured to define a bottom wall 26, spaced apart side walls 27 and 28, and inclined front and rear walls 29 and 30, respectively. The upper end of the housing 24 is closed by a rectangular flat sheet of translucent material 32, such as plexiglass. The translucent sheet 32 is supported on the upper edges of the side walls 27 and 28, the front wall 29 and the rear wall 30, and is secured in place by a pair of elongate retainer brackets 34 and 35 which overlie the upper surface 37 of the translucent sheet 32 and are secured, as by screws (not shown), respectively to the front wall 29 and to the rear wall 30.

Illuminating means, such as fluorescent tubes 39 and 40, generally extending between the side walls 27 and 28 within the housing 24 provide a conventional light source. The tubes are actuated by a source of electric power through cord 42 which may be externally controlled by push-button switch 43 carried by the side wall 27. A handle 44 may be mounted on the rear wall 30 to provide a convenient means for carrying the viewer.

Supporting Leg Assembly For a Transparency Viewer

The supporting leg assemblies, generally designated 47 and 48, are best seen in FIGS. 6-8 and 11-14. The supporting leg assemblies 47 and 48 are each spaced apart on the exterior of the bottom wall 26 and each extends preferably in parallel fashion generally between the respective edges of the front wall 29 and the rear wall 30. Because each of the supporting leg assemblies 47 and 48 is similarly constructed, in the interest of brevity and clarity, only one will be described in detail.

The supporting leg assembly 47 broadly preferably includes a channeled bracket or leg support 50, affording a U-shaped cross section together with a short leg 52 and a long leg 53, each also preferably being of U-shaped cross section.

The leg support 50 is positioned on the bottom wall 26 so that its center portion 55 rests against the exterior surface of the bottom wall 26 and is secured thereto by one or more screws 56 so that a downwardly opening channel 58 is defined by the downwardly depending side walls 59 and 60 of the leg support 50.

The colinearly arranged legs 52 and 53 may have an orientation opposite that of the leg support 50 and are of such size as to be nestably disposed within the open channel 58. The leg 52 is relatively short and has a rearward end 52a which is pivotally mounted to side walls 59 and 60 within the channel 58 at the rearward end thereof by a rivet 62 which extends through the side walls 59 and 60 of the leg support 50 and through the side walls 64 and 65 of the leg 52. Similarly, the relatively long leg 53 is pivotally mounted within the channel 58 by a rivet 67 which passes through the side walls 59 and 60 of the support 50 and through the side walls 69 and 70 of the leg 53 adjacent the end 53a thereof. The free ends 52b and 53b of the legs 52 and 53, respectively, are fitted with end caps 72 and 73, respectively. Rubber grommets 75 and 76 function as resilient feet and are secured adjacent the end 52a of the leg 52 and the end 53b of the leg 53 by screws 78.

As seen in FIG. 3, the transparency viewer 20 is horizontally disposed on a flat supporting surface by retracting or pivoting the legs 52 and 53 into nested position with respect to the channel 58 of the leg support 50 so that the grommets 75 and 76 support the viewer 20 on the horizontal surface 80. By pivotally mounting the short legs 52 at the rear of the housing 24 and the long legs 53 near the center of the housing 24, the degree of adjustments is increased for a predetermined leg length. To tilt the viewer at an angle of approximately 15° relative to horizontal as seen in FIG. 11, each short leg 52 is extended by pivoting it downwardly out of the channel 58 about the rivet 62 until the rearward edge 52c abuts the center portion 55 of the leg support 50. To position the transparency viewer 20 at an angle of approximately 70° relative to horizontal as in FIG. 12, each long leg 53 is extended by pivoting it downwardly out of the channel 58 about the rivet 67 until the rearward edge 53c abuts the center portion 55 of the leg support 50.

Means may be provided by way of key slots 83 in leg assemblies 47 and 48 for mounting the transparency viewer on an upright surface, such as wall 84 into which a nail 86 or similar anchored retainer has been driven. The key slot 83 is preferably formed adjacent the free end 53b of the leg 53. To prevent the leg 53 from pivoting about the rivet 67 when the transparency viewer 20 is hung on the wall 84, a screw (not shown) is threaded into one of the side walls 59 and 60 of the leg support 50 and into one of the side walls 69 and 70 of the leg 53. As a result, the transparency viewer 20 can be arranged in a vertical position as shown in FIG. 13 or can be positioned at an angle approximately 15° from vertical by extending the legs 52 as shown in FIG. 14.

Frame Assembly for Utilizing the Transparency Viewer in Combination

The frame assembly 22 includes a base 100 having a U-shaped cross-section, an upright support 101 having a U-shaped cross-section, and a bracing member 103 connected between the base 100 and the upright 101 to afford strength and structural support therefor. The base 100 has a forward end 100a and a rearward end 100b. The upright support 101 has a lower end 101a secured to the base 100 at a point intermediate the ends 100a and 100b, and is inclined rearwardly at an angle of approximately 70° so that its upper end 101b, overlies the rearward end 100b of the base 100. The base 100 has a forward portion 100c between its forward end 100a and the bracing member 103 of sufficient length to support the horizontal viewer 20a. Similarly, the upright support 101 has an upper portion 101c between its upper end 101b and the member 103 of sufficient length to support the uprightly inclined viewer 20b. Secured to the underside of the center wall portion 105 of the base 100 are resilient pads 108, which act as feet to support the base 100 on a supporting surface.

As best seen in FIG. 10, when the frame assembly 22 is utilized, the leg supports 50 of the viewer 20a are of a size and shape to be nestably positioned within the channels 110 defined by side walls 111 and 112 of the base 100. The side walls 111 and 112 are spaced apart sufficiently so that a leg support 50 may be easily inserted into the channel 110. The side walls 111 and 112 have a height such that when the leg support 50 is inserted within the channel 110, the grommets 75 and 76 abut the interior of the center wall portion 105 with the ends of the side walls 111 and 112 spaced from the bottom wall 26 of the housing 24. A knurled thumbscrew 115 inserted through an aperture 115a formed in the center portion 105 of the base 100 is threaded into a suitably aligned threaded aperture 117 positioned adjacent rivet 67 and formed in the center portion of leg 53. Thus the thumbscrews 115 releasably secure each of the frame assemblies 22 to the leg assemblies 47 and 48 of each viewer 20a and 20b to support the viewers in the manner shown in FIG. 1. Similar thrumbscrews 115 are provided for the upright supports 101 of each frame assembly 22 so as to retain viewer 20b in upright position in the manner previously described. Thus it is understood that two frame members 100 (FIG. 9) support the transparency viewers 20a and 20b.

Referring again to the frame assembly 100 of FIG. 9, each such assembly preferably has location pins 105a, 105b, and 105c secured within U-shaped base 100 and U-shaped support 101. These pins are positioned so that the supporting rubber grommets of each leg assembly 47 and 48 bear against the pins when the leg assemblies are properly positioned with respect to the frame assemblies 22. Such proper positioning aligns each thumbscrew 115 with aperture 115a and threaded aperture 117 to facilitate the securement of frame assemblies 22 to viewers 20a and 20b.

Transparency Viewer Overlay and Film Retaining Clips

The retaining brackets 34 and 35 secure the translucent sheet 32 to the housing 24. The brackets 24 and 35 are configured to have mounting portions 34a and 35a, respectively, secured to the housing and longitudinally extending portions 34b and 35b, respectively, overlying and spaced from the translucent sheet 32 so as to define along the forward and rearward edges of the translucent sheet 32 respective open longitudinal channels 130a and 130b, which are collectively designated 130.

As seen in FIGS. 1 and 3, an overlay device, generally designated 131, may be positioned against the translucent sheet 32 by moving the overlay device 131 into the respective channels 130, the ends of which are preferably open. The overlay 131 releasably holds a plurality of relatively stiff photographic slides 132. As shown herein, the slides are of similar size; however, the overlay device may be adjustably structurally arranged to accommodate slides of varying sizes. The slides 132 typically have a transparency film surrounded by a cardboard border.

The overlay 131 is preferably made up of a series of parallel, similarly constructed elongate members 135 which are connected at each end thereof to frame members 137 and 138, respectively, by screws 139 so that the elongate members 135 are held in fixed relation.

As seen in FIG. 16, each of the elongate members 135 is preferably of extruded aluminum and is configured to define a pair of longitudinal open channels 141 and 142, respectively. The open longitudinal channel 141 is defined by a forward wall 144, a rearward wall 145 spaced from the forward wall 144, and a bottom wall 146. The open longitudinal channel 142 is defined by a relatively short depending forward wall 148, a rearward wall 149 spaced from the forward wall 148, and a bottom wall 150 which faces in opposed relation to the bottom wall 146 and preferably is offset forwardly therefrom when the overlay device 131 is positioned as shown in FIG. 16. Thus channel 142 is preferably positioned forwardly of the channel 141 so that a transparency slide 132 will be held in tilted position with its upper edge forward of its lower edge (FIG. 16). Stated another way, when the overlay device 131 is positioned as in FIG. 3, the upper edge of a slide 132 will be tilted upwardly and occupy a position above that of the lower edge of a slide 132.

The channels 141 and 142 extend continuously between the oppositely disposed frame members 137 and 138. Resilient material 155, which may be of foam rubber or foamed plastic such as polyurethane, is disposed preferably within the open channel 141. Herein, the resilient material 155 preferably has a width greater than the distance between the walls 144 and 145 so that when material 155 is compressed and inserted within each of the channels 141, the inherent resiliency of the material is sufficient to effect functional engagement with each of the walls 144 and 145 to retain the resilient material 155 firmly in place.

It should be appreciated that the cross-sectional shape or configuration of the resilient material 155 may take a variety of forms to accommodate varying cross-sectional shapes of channel 141. It is also contemplated that the resilient material may be adhered in place.

As can best be seen in FIG. 16, the open channel 141 of one elongate member 135 faces, i.e., opens toward, the open channel 142 of the preceding elongate member in the series. The distance between the exposed surface of the resilient material 155 and the wall 150 of the opposed open channel 142 of an adjacent elongate member 135 is arranged to be less than the height of the transparency slide or slides 132 which are to be placed between two adjacent elongate members 135.

To place a slide in secure position in the overlay device 131, the slide is inserted into the open channel 141 by compressing the resilient material 155 of one elongate member 135 and then the upper end of the slide (FIG. 16) is positioned within the channel 142 of the adjacent elongate member 135. The inherent resiliency of the resilient material 155 maintains each slide 132 firmly in position on the overlay device. Thus the slides remain in their preselected position even if the overlay device 131 is tipped throughout 360°, or knocked over, or jarred when placed in storage position in a cabinet enclosure. These features are important where considerable time has been consumed in editing and sorting slides for a business, medical, or educational presentation.

Referring again to resilient material 155, it is within the concept of the present invention that such material be positioned in either channel 141 or 142, and also, that such material 155 may be positioned within both adjacent channels 141 and 142.

As best seen in FIG. 16, narrow, screw-receiving longitudinal concavities 158 are defined in each elongate member 135 by the bottom wall 146, the rearward wall 149 and wall 159. The cross-section of each concavity is of a size to securely receive the screws 139.

Each of the frame members 137 and 138 has a plurality of stamped protrusions 161 each of which is positioned to precisely locate an end of each of the elongate members 135 when the overlay device is being assembled. As best seen in FIG. 16 and FIG. 17, each protrusion 161 extends onto an end of channel 141 so as to maintain proper orientation of the elongate members relative to frame members 137 and 138 during assembly. To prevent marring of the translucent sheet 32, padding or tape 165 is secured to each of the elongate members 135 along the rear surface of the rearward wall 145.

As seen in FIGS. 15-18, the overlay 131 has relatively narrow lower and upper marginal edge portions, generally designated 170 and 171, respectively. As seen in FIG. 3, the lower and upper marginal edges 170 and 171 are positioned rearwardly and forwardly, respectively. The overlay 131, when retained adjacent the translucent sheet 32, has the respective marginal edge portions 170 and 171 inserted into the channels 130a and 130b defined by the brackets 34 and 35. The overlay 131 is of such size to span the surface of the translucent sheet 32 so that both marginal edges 170 and 171 may simultaneously reside in both of the channels 130. The marginal edges 170 and 171 have cross-sectional configurations generally similar to those of the respective channels 130 into which they may be positioned. As best seen in FIG. 17, the upper edge portion 171 is slightly longer than the lower edge portion 170. Thus, the overlay 131 may be positioned over the translucent sheet 32 in contacting relation therewith by either of two methods. The overlay 131 may be inserted from a lateral edge of the viewer 10 so that the edge portions 170 and 171 are inserted simultaneously into the open ends of the channels 130. Alternatively, the overlay 131 may be tilted slightly to insert the entire upper edge portion 171 into the channel 130b and then moving the overlay 131 back against the translucent sheet 32 and finally moving the overlay 131 toward the channel 130a to insert the entire smaller lower edge portion 170 therein. The relative spacing between the channels 130 prevent the upper edge portion 171 from moving completely out of the channel 130b. As a result, the overlay 131 fits into and is retained in the channels 130. Consequently, the viewer 20 may be positioned in any desired orientation, some of which are illustrated in FIGS. 1, 2, and 11-14. Referring again to FIGS. 15-18, the lower marginal edge portion 170 is defined by the rearward wall 149 and the wall 159 of the lowermost elongate member 135. The upper marginal edge portion 171 of the overlay 131 is defined by the forward wall 144 and the rearward wall 145 of the uppermost elongate member 135.

Referring to FIGS. 1, 4, and 5, a film retaining clip 180 is illustrated. The retaining clip is configured so that the base mounting portion may be properly placed within the channel 130. The clip 180 as will be seen is adapted to retain large transparencies 182 such as photographic negatives of x-rays, which are flexible and are less rigid than the transparency slides 132. The retaining clip 180 is a spring clip and is generally U-shaped with arcuate legs 184 and 185. The base of the retaining clip 180 has a configuration similar to that of the channels 130 so that the clip when compressed may be inserted therein and be movably longitudinally therealong. The lower leg 184 has an upturned end 187 permitting the transparencies 182 to be inserted between the clip 180 and the translucent sheet 32 with some ease. When a transparency is slid under the lower leg 184, the lower leg 184 is cammed upwardly. Because of the inherent resiliency of the retaining clip 180, the transparency 182 is held in place firmly against the upper surface 37 of the translucent sheet 32. The channel 130 is provided with a segment 190 of the upper leg 185 so as to prevent the retaining clip 180 from moving out of the channel 130 along the translucent sheet 32 while permitting movement longitudinally of the brackets 34 and 35.

Manual deflection of the upper leg 185 downwardly toward the translucent sheet 32 to disengage the raised segment 190 from the groove 188 permits removal of the mounting portion of the retaining clip 180 from the channel 130. The upper leg 185 is bent upwardly away from the lower leg 184 so that the upper leg 185 may be deflected downwardly toward the lower leg 184 sufficiently to permit removal of the retaining clip 180 without interfering with the lower leg 184. The retaining clip 180 may also be removed by sliding it laterally outward from the open end of the channel 130. The grooves 188 formed in the depending wall portions 34b and 35b do not interfere with the placement of the marginal edges 170 and 171 of the overlay 131 into the channels 130. As should be apparent, any number of retaining clips may be placed into the channels 130 at any position desired.

In addition to the advantages provided by the overlay device itself and its unique coaction with the transparency viewer, the present invention provides a highly versatile unit in use. The viewer may be made portable and its low profile enhances the potential areas of use. Furthermore, the viewer affords structure adapting it for a plurality of uses with the translucent illuminated sheet capable of being disposed in a multitude of convenient viewing positions.

I claim:

1. In combination with a transparency viewer provided with a housing formed of peripheral side walls closed by a bottom surface and a top translucent viewing surface with front and rear edges and having illuminating means within the housing for lighting said translucent surface, a leg construction for adjustably orienting the viewer on a supporting surface comprising: a first pair of spaced legs, each of said first legs being pivotally mounted to said housing for swinging movement between a retracted position in close alignment with said bottom surface and an extended position outward from said bottom surface; and a second pair of spaced legs, each of said second legs being pivotally mounted to said housing for swinging movement between a retracted position in close alignment with said bottom surface and an extended position outward from said bottom surface, whereby said transparency viewer may be positioned on the supporting surface with neither pair of legs extended so that said transparency viewer lies adjacent the supporting surface, with said first pair of legs extended so that the transparency viewer is tilted on one edge at an angle to the supporting surface, or with said second pair of legs extended so that said transparency viewer is tilted on one edge at a different angle to the supporting surface than with said first pair of legs extended.

2. The transparency viewer of claim 1 further including mounting means located on said bottom surface which act in cooperation with retainer means located on a vertical surface to support said transparency viewer adjacent said vertical surface with said bottom surface substantially parallel said vertical surface.

3. The transparency viewer of claim 2 wherein said mounting means is comprised of keyhole shaped slots located on each leg of said second pair of legs remote from said housing pivot and wherein said retainer means is comprised of a mechanical fastener.

4. The transparency viewer of claim 1 wherein one of said first pair of legs is colinearly arranged with one leg of said second pair of legs to define a first leg assembly and the other leg of said first pair of legs is colinearly arranged with the other leg of said second pair of legs to define a second leg assembly spaced from said first leg assembly.

5. The transparency viewer of claim 4 wherein said second leg of each leg assembly has a length greater than said first leg.

6. The transparency viewer of claim 5 wherein each of said first legs is pivotally mounted adjacent the rear edge of said housing and each of said second legs is pivotally mounted approximately midway between the front and rear edges of said housing.

7. The transparency viewer of claim 4 further including a pair of brackets secured in spaced relation to said housing one for each leg assembly, each bracket extending generally between the front and rear edges of said housing and having spaced apart side walls extending downwardly from said housing to define an open channel, said first and second legs of each leg assembly being arranged between said side walls of one of said brackets and pivotally mounted thereto, whereby each leg may be selectively pivoted into and out of its respective channel.

8. The transparency viewer of claim 7 wherein said first leg of each leg assembly has one end pivotally mounted adjacent the rear of its respective bracket with its opposite end swinging about its pivoted one end, said opposite end extending from its respective channel when pivoted to its extended position and lying within its respective channel when pivoted to its retracted position.

9. The transparency viewer of claim 8 wherein said second leg of each leg assembly has one end pivotally mounted near the midpoint between the front and rear ends of its respective bracket with its opposite end swinging about its pivoted one end, said opposite end of said second leg extending from its respective channel when pivoted to its extended position and lying within its respective channel when pivoted to its retracted position.

10. The transparency viewer of claim 8 wherein each of said first and second legs of each leg assembly when moved to its respective retracted position has said pivoted one end disposed rearward of said opposite end.

11. The transparency viewer of claim 7 wherein each bracket has a generally U-shaped cross section defined by a crosspiece and spaced side walls with the crosspiece thereof being secured to said bottom surface of said housing.

12. The transparency viewer of claim 11 wherein each leg has a generally U-shaped cross section defined by a crosspiece and spaced side walls with said side walls being disposed adjacent the side walls of its respective bracket, and further including pivot means extending between the side walls of each leg and its respective bracket for mounting thereof.

13. The transparency viewer of claim 12 wherein the crosspiece of each leg is remote from the crosspiece of its respective bracket, the side walls of each of the legs extending toward the bracket crosspiece, the end of each leg adjacent said pivot means abutting the crosspiece of its respective bracket to prevent further motion when the leg is moved to its extended position.

14. The transparency viewer of claim 13 further including resilient pads secured to the external surface of each leg to act as feet for said viewer when said legs are retracted into their respective channels.

15. In combination with a transparency viewer provided with a housing formed of peripheral side walls and closed by a translucent viewing surface defining the top thereof and a bottom surface spaced from said translucent surface with front and rear edges and having illuminating means within said housing for lighting said translucent surface, a leg assembly for positioning the viewer on a supporting surface comprising: a pair of brackets carried by the bottom of said housing in spaced relation, each bracket extending generally between said front and rear edges and having spaced apart side walls extending downwardly from the housing bottom to define an open channel; a first pair of legs, one of said first pair of legs being pivotally mounted in each bracket between said channel side walls for swinging movement between a retracted position within its respective channel in close alignment with the housing bottom and an extended position outward from the housing bottom; and a second pair of legs having a length greater than said first legs, one of said second pair of legs being pivotally mounted between said side walls of each bracket colinearly of said first legs for swinging movement between a retracted position within its respective channel in close alignment with the housing bottom and an extended position outward from the housing bottom, whereby said transparency viewer may be positioned on the supporting surface with neither pair of legs extended so that said transparency viewer lies adjacent the supporting surface, or with either of independently movable said pairs of legs extended so that said transparency viewer is tilted on one edge at an angle to the supporting surface.

* * * * *